United States Patent
Boualleg et al.

(10) Patent No.: US 11,364,490 B2
(45) Date of Patent: Jun. 21, 2022

(54) METHOD FOR PREPARING A NICKEL- AND COPPER-BASED BIMETALLIC CATALYST FOR HYDROGENATING AROMATIC COMPOUNDS

(71) Applicant: IFP Energies Nouvelles, Rueil-Malmaison (FR)

(72) Inventors: Malika Boualleg, Rueil-Malmaison (FR); Anne-Agathe Quoineaud, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 78 days.

(21) Appl. No.: 17/048,223

(22) PCT Filed: Apr. 5, 2019

(86) PCT No.: PCT/EP2019/058581
§ 371 (c)(1),
(2) Date: Oct. 16, 2020

(87) PCT Pub. No.: WO2019/201618
PCT Pub. Date: Oct. 24, 2019

(65) Prior Publication Data
US 2021/0154653 A1    May 27, 2021

(30) Foreign Application Priority Data

Apr. 18, 2018  (FR) ...................... 1853388

(51) Int. Cl.
| | | |
|---|---|---|
| *B01J 37/02* | (2006.01) | |
| *B01J 6/00* | (2006.01) | |
| *B01J 23/72* | (2006.01) | |
| *B01J 23/755* | (2006.01) | |
| *B01J 37/08* | (2006.01) | |
| *B01J 37/18* | (2006.01) | |
| *B01J 37/20* | (2006.01) | |
| *C10G 45/48* | (2006.01) | |
| *B01J 21/04* | (2006.01) | |

(52) U.S. Cl.
CPC .......... *B01J 37/0205* (2013.01); *B01J 6/001* (2013.01); *B01J 23/72* (2013.01); *B01J 23/755* (2013.01); *B01J 37/024* (2013.01); *B01J 37/08* (2013.01); *B01J 37/18* (2013.01); *B01J 37/20* (2013.01); *C10G 45/48* (2013.01); *B01J 21/04* (2013.01)

(58) Field of Classification Search
CPC ... B01J 6/001; B01J 21/04; B01J 23/72; B01J 23/755; B01J 23/892; B01J 37/0205; B01J 37/024; B01J 37/08; B01J 37/18; B01J 37/20; C10G 45/48
See application file for complete search history.

(56) References Cited

U.S. PATENT DOCUMENTS

| | | |
|---|---|---|
| 5,948,942 A | 9/1999 | Ramirez de Agudelo et al. |
| 2009/0299114 A1* | 12/2009 | Ryu ...................... B01J 23/892 585/274 |
| 2011/0160503 A1 | 6/2011 | Fischer et al. |
| 2016/0264882 A1 | 9/2016 | Corvaisier et al. |

FOREIGN PATENT DOCUMENTS

WO     2007/084471 A1    7/2007

OTHER PUBLICATIONS

International Search Report dated Aug. 23, 2019 issued in corresponding PCT/EP2019/058581 application (3 pages).

* cited by examiner

*Primary Examiner* — Brian A McCaig
(74) *Attorney, Agent, or Firm* — Millen White Zelano & Branigan, PC; Brion P. Heaney

(57) ABSTRACT

Method for preparing a catalyst comprising a bimetallic active phase made of nickel and copper, and a support comprising a refractory oxide, comprising the following steps:
- a step of bringing the support into contact with a solution containing a nickel precursor is carried out;
- a step of bringing the support into contact with a solution containing a copper precursor is carried out;
- a step of drying the catalyst precursor at a temperature lower than 250° C. is carried out;
- the catalyst precursor obtained is supplied to a hydrogenation reactor, and a step of reduction by bringing said precursor into contact with a reducing gas at a temperature lower than 200° C. for a period greater than or equal to 5 minutes and less than 2 hours is carried out.

15 Claims, No Drawings

METHOD FOR PREPARING A NICKEL- AND COPPER-BASED BIMETALLIC CATALYST FOR HYDROGENATING AROMATIC COMPOUNDS

TECHNICAL FIELD

The present invention relates to a method for preparing a supported metal catalyst, comprising nickel and copper, intended particularly for the hydrogenation of unsaturated hydrocarbons.

The present invention also relates to the use of these catalysts in reactions for the hydrogenation of unsaturated hydrocarbons, and more particularly in the hydrogenation of aromatic compounds.

PRIOR ART

The catalysts for the hydrogenation of aromatic compounds are generally based on metals from Group VIII of the Periodic Table of the Elements, such as nickel. The metal is in the form of nanometric metal particles deposited on a support which may be a refractory oxide. The content of metal from Group VIII, the optional presence of a second metal element, the size of the metal particles and the distribution of the active phase in the support and also the nature and the pore distribution of the support are parameters which may have an influence on the performance of the catalysts.

The rate of the hydrogenation reaction is governed by several criteria, such as the diffusion of the reactants toward the surface of the catalyst (external diffusional limitations), the diffusion of the reactants in the porosity of the support toward the active sites (internal diffusional limitations) and the intrinsic properties of the active phase, such as the size of the metal particles and the distribution of the active phase within the support.

The promotion of a nickel-based catalyst has frequently been proposed in order to improve performance levels in the hydrogenation of unsaturated hydrocarbons. For example, the promotion of a nickel-based catalyst has frequently been proposed in order to improve performance levels in selective hydrogenation. By way of illustration, U.S. Pat. No. 5,208,405 discloses a nickel- and silver-based catalyst for the selective hydrogenation of $C_4$-$C_{10}$ diolefins. Furthermore, it is known practice to promote nickel, predominantly present, with metals from group IB, in particular gold (FR 2,949,077) or tin (FR 2,949,078). Document FR 3,011,844 discloses a catalyst for the implementation of a selective hydrogenation method comprising a support and an active metallic phase deposited on the support, the active metallic phase comprising copper and at least one metal out of nickel or cobalt in a Cu:(Ni and/or Co) molar ratio greater than 1.

Moreover, prior to the employment of such catalysts and the use thereof in a hydrogenation method, a step of reducing treatment in the presence of a reducing gas is carried out so as to obtain a catalyst comprising an active phase at least partially in metallic form. This treatment makes it possible to activate the catalyst and to form metal particles. This treatment may be carried out in situ or ex situ, that is to say after or before the catalyst is charged to the hydrogenation reactor.

Subjects of the Invention

Continuing its research in the field of hydrogenating catalysts, the applicant has now discovered that it is possible to prepare catalysts which are particularly active, and particularly selective, in the hydrogenation of aromatic compounds, by successively and not simultaneously placing two specific metal precursors in contact on a porous support, chosen from nickel precursors and copper precursors, in a specific Cu:Ni ratio, and by carrying out, after these contacting steps, an in-situ reduction step in the catalytic reactor in the presence of a reducing gas, at a temperature less than 200° C. Without wishing to be bound by any theory, it has been noted by the applicant that, during the preparation of the catalyst, the presence of copper greatly improves the reducibility of the nickel on the support, regardless of the order of addition of the metal (nickel and copper) precursors, which makes it possible to carry out a step of reducing the metal elements in the presence of a reducing gas at temperatures which are lower and reaction times which are shorter than those commonly used in the prior art. The use of less severe operating conditions than in the prior art makes it possible to directly carry out the reduction step within the reactor in which it is the aim to carry out the hydrogenation of aromatic compounds. Moreover, the presence of copper in the catalyst makes it possible to increase the resistance of the catalyst when the latter is brought into contact with a hydrocarbon-based feedstock comprising sulfur. Indeed, compared to nickel, the copper present in the catalyst more easily captures the sulfur-containing compounds included in the feedstock, thereby avoiding irreversibly poisoning the most virulent active sites of the nickel which exist on the new catalyst. Finally, the preparation method according to the invention makes it possible in particular, by carrying out two distinct steps of impregnating the metal precursors on the support, to avoid the formation of nickel and copper-based alloys, which are not desired in the context of the present invention. Indeed, a nickel-copper alloy would lead to a poorer activity and/or selectivity than those of nickel alone.

One subject of the present invention is a method for preparing a catalyst for the hydrogenation of aromatic or polyaromatic compounds comprising a bimetallic active phase based on a first nickel metal element, in a proportion of 10 to 50% by weight of nickel element relative to the total weight of the catalyst, and a second copper metal element, in a proportion of 0.5 to 15% by weight of copper element relative to the total weight of the catalyst, the molar ratio between the copper and the nickel being less than 1, and a support comprising at least one refractory oxide chosen from silica, alumina and silica-alumina, said method comprising the following steps:

a) at least one step of bringing the support into contact with at least one solution containing at least one nickel precursor is carried out;

b) a step of bringing the support into contact with at least one solution containing at least one copper precursor is carried out;

the steps a) and b) being carried out separately in either order;

c) at least one step of drying the catalyst precursor at the end of step a) and b), or b) and a), at a temperature lower than 250° C. is carried out;

d) the catalyst precursor obtained at the end of step c) is supplied to a reactor for the hydrogenation of aromatic compounds, and a step of reduction by bringing said precursor into contact with a reducing gas at a temperature lower than 200° C. for a period greater than or equal to 5 minutes and less than 2 hours is carried out;

e) a step of passivation of the catalyst obtained in step d) with a sulfur compound is carried out.

Preferably, step b) is carried out before step a).

Advantageously, step d) is carried out at a temperature of between 130 and 190° C.

Advantageously, step d) is carried out for between 10 minutes and 110 minutes.

Preferably, step e) is carried out at a temperature of between 20 and 350° C. for 10 to 240 minutes.

More preferably, in step e), the sulfur compound is chosen from thiophene, thiophane, dimethyl sulfide, diethyl sulfide, dipropyl sulfide, propylmethyl sulfide, dithiodiethanol.

Advantageously, a step of drying the catalyst precursor at a temperature less than 250° C. is carried out between step a) and step b).

Advantageously, the copper content is between 0.5 and 12% by weight of copper element relative to the total weight of the catalyst.

Preferably, the copper precursor is chosen from copper acetate, copper acetylacetonate, copper nitrate, copper sulfate, copper chloride, copper bromide, copper iodide or copper fluoride.

More preferably, the copper precursor is copper nitrate.

Advantageously, the reducing gas of step d) is dihydrogen.

Preferably, the hydrogen flow rate, expressed in l/hour/gram of catalyst precursor is between 0.01 and 100 l/hour/gram of catalyst precursor.

Advantageously, a step of heat treatment of the dried catalyst precursor obtained in step c) is carried out, before step d), at a temperature of between 250 and 1000° C.

Preferably, the support is an alumina.

Another subject according to the invention relates to a method for the hydrogenation of at least one aromatic or polyaromatic compound present in a hydrocarbon feedstock having a final boiling point of less than or equal to 650° C., said method being carried out in the gas phase or in the liquid phase, at a temperature of between 30 and 350° C., at a pressure of between 0.1 and 20 MPa, at a hydrogen/(aromatic compounds to be hydrogenated) molar ratio between 0.1 and 10 and at an hourly space velocity HSV of between 0.05 and 50 $h^{-1}$, in the presence of a catalyst obtained according to the preparation method according to the invention.

DETAILED DESCRIPTION OF THE INVENTION

1. Definitions

Hereinbelow, the groups of chemical elements are given according to the CAS classification (CRC Handbook of Chemistry and Physics, published by CRC Press, Editor in Chief D. R. Lide, 81st edition, 2000-2001). For example, group VIII according to the CAS classification corresponds to the metals of columns 8, 9 and 10 according to the new IUPAC classification.

The degree of reduction (DR) of a metal M contained in the catalyst is defined as being the percentage of said metal M reduced after the step of reducing said catalyst. The degree of reduction (DR) corresponds to the ratio between the amount of metal reduced (M1) and the amount of theoretically reducible metal present on the catalyst, measured by X-ray fluorescence (M2), i.e. DR (%)=(M1/M2)×100. In the context of the present invention, the degree of reduction of the nickel (Ni) was measured by X-ray diffraction (XRD) analysis. The description of the method for measuring the amount of reducible metal on oxide catalysts is explained later in the description (cf. examples section, paragraph c)).

The specific surface area of the catalyst or of the support used for the preparation of the catalyst according to the invention is understood to mean the BET specific surface determined by nitrogen adsorption in accordance with Standard ASTM D 3663-78 drawn up from the Brunauer-Emmett-Teller method described in the journal "The Journal of the American Chemical Society", 60, 309 (1938).

"Macropores" is understood to mean pores the opening of which is greater than 50 nm.

"Mesopores" is understood to mean pores the opening of which is between 2 nm and 50 nm, limits included.

"Micropores" is understood to mean pores the opening of which is less than 2 nm.

The term "total pore volume" of the catalyst or of the support used for the preparation of the catalyst according to the invention is intended to mean the volume measured by intrusion with a mercury porosimeter according to Standard ASTM D4284-83 at a maximum pressure of 4000 bar (400 MPa), using a surface tension of 484 dyne/cm and a contact angle of 140°. The wetting angle was taken equal to 140° following the recommendations of the work "Techniques de l'ingénieur, traité analyse et caractérisation" [Techniques of the Engineer, Analysis and Characterization Treatise], pages 1050-1055, written by Jean Charpin and Bernard Rasneur.

In order to obtain better accuracy, the value of the total pore volume corresponds to the value of the total pore volume measured by intrusion with a mercury porosimeter measured on the sample minus the value of the total pore volume measured by intrusion with a mercury porosimeter measured on the same sample for a pressure corresponding to 30 psi (approximately 0.2 MPa).

The volume of the macropores and of the mesopores is measured by porosimetry by intrusion of mercury according to Standard ASTM D4284-83 at a maximum pressure of 4000 bar (400 MPa), using a surface tension of 484 dyne/cm and a contact angle of 140°. The value from which the mercury fills all the intergranular voids is set at 0.2 MPa and it is considered that, above this, the mercury penetrates into the pores of the sample.

The macropore volume of the catalyst or of the support used for the preparation of the catalyst according to the invention is defined as being the cumulative volume of mercury introduced at a pressure of between 0.2 MPa and 30 MPa, corresponding to the volume present in the pores with an apparent diameter of greater than 50 nm.

The mesopore volume of the catalyst or of the support used for the preparation of the catalyst according to the invention is defined as being the cumulative volume of mercury introduced at a pressure of between 30 MPa and 400 MPa, corresponding to the volume present in the pores with an apparent diameter of between 2 and 50 nm.

The volume of the micropores is measured by nitrogen porosimetry. The quantitative analysis of the microporosity is performed using the "t" method (method of Lippens-De Boer, 1965), which corresponds to a transform of the starting adsorption isotherm, as described in the work "Adsorption by powders and porous solids. Principles, methodology and applications", written by F. Rouquérol, J. Rouquérol and K. Sing, Academic Press, 1999.

The median mesopore diameter is also defined as being the diameter such that all the pores, among the combined pores constituting the mesopore volume, with a size of less than this diameter constitute 50% of the total mesopore volume determined by intrusion with a mercury porosimeter.

The median macropore diameter is also defined as being the diameter such that all the pores, among the combined pores constituting the macropore volume, with a size of less than this diameter constitute 50% of the total macropore volume determined by intrusion with a mercury porosimeter.

2. Description

Catalyst Preparation Method

The method for preparing the bimetallic catalyst, comprising a nickel- and copper-based active phase and a support comprising at least one refractory oxide chosen from silica, alumina and silica-alumina, comprises at least the following steps:
- a) at least one step of bringing the support into contact with at least one solution containing at least one nickel precursor is carried out;
- b) a step of bringing the support into contact with at least one solution containing at least one copper precursor is carried out;
the steps a) and b) being carried out separately in either order;
- c) at least one step of drying the catalyst precursor at the end of step a) and b), or b) and a), at a temperature lower than 250° C. is carried out;
- d) the catalyst precursor obtained at the end of step c) is supplied to a reactor for the hydrogenation of aromatic or polyaromatic compounds, and a step of reduction by bringing said precursor into contact with a reducing gas at a temperature lower than 200° C. for a period greater than or equal to 5 minutes and less than 2 hours is carried out;
- e) a step of passivation of the catalyst obtained in step d) with a sulfur compound is carried out.

The steps of the method for preparing the catalyst are explained in detail below.

Step a) Contacting the Nickel Precursor

The deposition of nickel on said support, in accordance with the implementation of step a), can be carried out by dry impregnation or excess impregnation, or also by deposition-precipitation, according to methods well known to those skilled in the art.

Said step a) is preferably carried out by impregnation of the support consisting, for example, in placing said support in contact with at least one solution, which is aqueous or organic (for example methanol or ethanol or phenol or acetone or toluene or dimethyl sulfoxide (DMSO)) or indeed consists of a mixture of water and of at least one organic solvent, containing at least one nickel precursor at least partially in the dissolved state, or also in placing said support in contact with at least one colloidal solution of at least one nickel precursor, in the oxidized form (nanoparticles of oxide, of oxy(hydroxide) or of hydroxide of the nickel) or in the reduced form (metal nanoparticles of the nickel in the reduced state). Preferably, the solution is aqueous. The pH of this solution could be modified by the optional addition of an acid or of a base. According to another preferred alternative form, the aqueous solution may contain ammonia or ammonium $NH_4^+$ ions.

Preferably, said step a) is carried out by dry impregnation, which consists in placing the catalyst support in contact with a solution containing at least one nickel precursor, in which the volume of the solution is between 0.25 and 1.5 times the pore volume of the support to be impregnated.

When the nickel precursor is introduced in aqueous solution, a nickel precursor is advantageously used in the form of nitrate, carbonate, acetate, chloride, hydroxide, hydroxycarbonate, oxalate, sulfate or formate, of complexes formed by a polyacid or an acid-alcohol and its salts, of complexes formed with acetylacetonates, of tetrammine or hexammine complexes, or also of any other inorganic derivative soluble in aqueous solution, which is placed in contact with said support.

Preferably, nickel nitrate, nickel hydroxide, nickel carbonate, nickel chloride or nickel hydroxycarbonate is advantageously used as nickel precursor. Very preferably, the nickel precursor is nickel nitrate, nickel carbonate or nickel hydroxide.

The amounts of the nickel precursor(s) introduced into the solution are chosen such that the total nickel content is between 10 to 50% by weight, preferably between 14 to 45% by weight, preferably between 20 to 40% by weight of said element relative to the total weight of the catalyst. In the embodiment in which step a) is carried out by dry impregnation or excess impregnation, preferably dry impregnation, the impregnation of the nickel with the support may advantageously be carried out via at least two impregnation cycles, using identical or different nickel precursors in each cycle. In this case, each impregnation is advantageously followed by drying and optionally a heat treatment.

Step b) Contacting the Copper Precursor

The deposition of copper on said support, in accordance with the implementation of step b), can be carried out by dry impregnation or excess impregnation, or also by deposition-precipitation, according to methods well known to those skilled in the art.

Said step b) is preferably carried out by impregnation of the support consisting, for example, in placing said support in contact with at least one solution, which is aqueous or organic (for example methanol or ethanol or phenol or acetone or toluene or dimethyl sulfoxide (DMSO)) or indeed consists of a mixture of water and of at least one organic solvent, containing at least one copper precursor at least partially in the dissolved state, or also in placing said support in contact with at least one colloidal solution of at least one copper precursor, in the oxidized form (nanoparticles of oxide, of oxy(hydroxide) or of hydroxide of copper) or in the reduced form (metal nanoparticles of copper in the reduced state). Preferably, the solution is aqueous. The pH of this solution could be modified by the optional addition of an acid or of a base.

Preferably, said step b) is carried out by dry impregnation, which consists in placing the catalyst support in contact with a solution containing at least one copper precursor, in which the volume of the solution is between 0.25 and 1.5 times the pore volume of the support to be impregnated.

When the copper precursor is introduced in aqueous solution, a copper precursor in mineral or organic form is advantageously used. In mineral form, the copper precursor can be chosen from copper acetate, copper acetylacetonate, copper nitrate, copper sulfate, copper chloride, copper bromide, copper iodide or copper fluoride. Very preferably, the copper precursor salt is copper nitrate.

The amounts of the copper precursor(s) introduced into the solution are chosen such that the total copper content is between 0.5 and 15% by weight of copper element relative to the total weight of the catalyst, preferably between 0.5 and 12% by weight, preferably between 0.75 and 10% by weight, and even more preferably between 1 and 9% by weight.

Steps a) and b) are carried out separately in either order. The impregnation of the nickel precursor is not carried out at the same time as the impregnation of the copper precursor, so as not to form a nickel-copper-based alloy, which is not desirable in the context of the present invention as this would lead to a poorer activity and/or selectivity than those of nickel alone, which is not desired in the context of the present invention.

Preferably, step b) is carried out before step a), that is to say a first step of impregnating the support with a copper precursor is carried out, then a second step of impregnating the support with a nickel precursor is carried out (pre-impregnation). The applicant has discovered that the pre-impregnation (with respect to the impregnation of the nickel precursor) of a copper precursor on the support makes it possible to obtain better results in terms of reducibility of the nickel compared to a post-impregnation of the copper precursor (with respect to the impregnation of the nickel precursor), this being for identical catalyst reduction operating conditions (temperature, time, reducing gas).

Optionally, between the two successive impregnation steps, a step of drying the catalyst precursor is carried out at a temperature less than 250° C., preferably between 15 and 240° C., more preferably between 30 and 220° C., even more preferably between 50 and 200° C., and even more preferably between 70 and 180° C., for a period typically between 10 minutes and 24 hours.

Step c) Drying the Impregnated Support

Step c) of drying the impregnated support is carried out at a temperature less than 250° C., preferably between 15 and 180° C., more preferably between 30 and 160° C., even more preferably between 50 and 150° C., and even more preferably between 70 and 140° C., for a period typically between 10 minutes and 24 hours. Longer periods of time are not ruled out, but do not necessarily afford any improvement.

The drying step can be carried out by any technique known to those skilled in the art. It is advantageously carried out under an inert atmosphere or under an oxygen-containing atmosphere or under a mixture of inert gas and oxygen. It is advantageously carried out at atmospheric pressure or at reduced pressure. Preferably, this step is carried out at atmospheric pressure and in the presence of air or nitrogen.

Heat Treatment of the Dried Catalyst (Optional Step)

The dried catalyst precursor can undergo an additional heat treatment step, before the reduction step d), at a temperature of between 250 and 1000° C. and preferably between 250 and 750° C., for a period typically between 15 minutes and 10 hours, under an inert atmosphere or under an oxygen-containing atmosphere, optionally in the presence of water. Longer treatment times are not ruled out but do not necessarily afford an improvement.

The term "heat treatment" is intended to mean temperature treatment respectively without the presence or in the presence of water. In the latter case, contact with the steam can take place at atmospheric pressure or under autogenous pressure. Several combined cycles without the presence or with the presence of water can be performed. After this or these treatment(s), the catalyst precursor comprises nickel in the oxide form, that is to say in the NiO form.

In the event of water being present, the water content is preferably between 150 and 900 grams per kilogram of dry air and even more preferably between 250 and 650 grams per kilogram of dry air.

Step d) Reduction with a Reducing Gas

Prior to the use of the catalyst in the catalytic reactor and the implementation of a hydrogenation method, a reducing treatment step d) is carried out in the presence of a reducing gas so as to obtain a catalyst comprising nickel at least partially in the metallic form. This step is carried out in situ, that is to say after charging the catalyst to a reactor for the hydrogenation of aromatic or polyaromatic compounds. This treatment makes it possible to activate said catalyst and to form metal particles, in particular of nickel in the zero-valent state. The in-situ implementation of the catalyst reducing treatment makes it possible to dispense with an additional step of passivation of the catalyst with an oxygen-bearing compound or $CO_2$, which is necessarily the case when the catalyst is prepared by carrying out a reducing treatment ex situ, that is to say outside the reactor used for selective hydrogenation. In fact, when the reducing treatment is carried out ex situ, it is necessary to carry out a passivation step in order to preserve the metallic phase of the catalyst in the presence of air (during operations of transport and charging of the catalyst to the hydrogenation reactor), then to carry out a new step of reducing the catalyst.

The reducing gas is preferably hydrogen. The hydrogen can be used pure or as a mixture (for example a hydrogen/nitrogen, hydrogen/argon or hydrogen/methane mixture). In the case where the hydrogen is used as a mixture, all proportions can be envisaged.

According to an essential aspect of the preparation method according to the invention, said reducing treatment is carried out at a temperature less than 200° C., preferably between 130 and 190° C., and more preferably between 145 and 175° C. The duration of the reducing treatment is between 5 minutes and less than 2 hours, preferably between 10 minutes and 110 minutes. The use of less severe operating conditions than in the prior art makes it possible to directly carry out the reduction step within the reactor in which it is the aim to carry out the selective hydrogenation of polyunsaturated fractions. Furthermore, the presence of copper in the catalyst makes it possible to preserve good activity of the catalyst and a good service life of the catalyst when the latter is placed in contact with a hydrocarbon-based feedstock comprising sulfur, in particular steam cracking and/or catalytic cracking $C_3$ hydrocarbon fractions. Indeed, compared to nickel, the copper present in the catalyst more easily captures the sulfur-containing compounds included in the feedstock, thereby avoiding irreversibly poisoning the most virulent active sites of the nickel which exist on the new catalyst.

The rise in temperature up to the desired reduction temperature is generally slow, for example set between 0.1 and 10° C./min, preferably between 0.3 and 7° C./min.

The hydrogen flow rate, expressed in l/hour/gram of catalyst precursor, is between 0.01 and 100 l/hour/gram of catalyst, preferably between 0.05 and 10 l/hour/gram of catalyst precursor and more preferably still between 0.1 and 5 l/hour/gram of catalyst precursor.

Passivation Step e)

The catalyst prepared according to the method according to the invention undergoes a passivation step with a sulfur-containing compound which makes it possible to improve the selectivity of the catalysts and to avoid thermal runaway during the start-up of new catalysts. The passivation generally consists in irreversibly poisoning, by the sulfur-containing compound, the most virulent active sites of the nickel which exist on the new catalyst and thus in weakening the activity of the catalyst in favor of its selectivity. The passivation step is carried out using methods known to those skilled in the art.

The passivation step with a sulfur-containing compound is generally carried out at a temperature of between 20 and 350° C., preferably between 40 and 200° C., for 10 to 240 minutes. The sulfur-containing compound is, for example, chosen from the following compounds: thiophene, thiophane, alkyl monosulfides, such as dimethyl sulfide, diethyl sulfide, dipropyl sulfide and propyl methyl sulfide, or also an organic disulfide of formula HO—$R_1$—S—S—$R_2$—OH, such as dithiodiethanol of formula HO—$C_2H_4$—S—S—$C_2H_4$—OH (often known as DEODS). The sulfur content is generally between 0.1% and 2% by weight of said element relative to the total weight of the catalyst.

Catalyst

The catalyst that can be obtained by the preparation method according to the invention comprises a nickel- and copper-based active phase, and a support containing a refractory oxide chosen from silica, alumina and silica-alumina.

The amounts of the copper precursor(s) introduced into the solution are chosen such that the total copper content is between 0.5 and 15% by weight of copper element relative to the total weight of the catalyst, preferably between 0.5 and 12% by weight, preferably between 0.75 and 10% by weight, and even more preferably between 1 and 9% by weight. The presence of copper greatly improves the reducibility of the nickel on the support, regardless of the order of addition of the metal precursors (nickel and copper), which makes it possible to carry out a step of reducing the metal elements in the presence of a reducing gas at temperatures which are lower and reaction times which are shorter than those commonly used in the prior art.

The nickel content is between 10 to 50% by weight, preferably between 14 to 45% by weight, preferably between 20 to 40% by weight of said element relative to the total weight of the catalyst.

The molar ratio between the copper and the nickel must be less than 1, preferably less than 0.8, more preferably less than 0.7, even more preferably less than 0.6, preferably less than 0.5, and even more preferably less than 0.4.

The porous support is chosen from the group consisting of silica, alumina and silica-alumina. Even more preferably, the support is alumina. The alumina may be present in all possible crystallographic forms: alpha, delta, theta, chi, rho, eta, kappa, gamma, etc., taken alone or as a mixture. Preferably, the support is chosen from alpha, delta, theta and gamma alumina.

The specific surface area of the support is generally greater than or equal to 30 $m^2/g$, preferably greater than or equal to 50 $m^2/g$, more preferably between 60 $m^2/g$ and 500 $m^2/g$, and more preferably still between 70 $m^2/g$ and 400 $m^2/g$. The BET specific surface area is measured by nitrogen physisorption.

The total pore volume of the support is generally between 0.1 and 1.5 $cm^3/g$, preferably between 0.35 and 1.2 $cm^3/g$, and even more preferably between 0.4 and 1.0 $cm^3/g$, and even more preferably between 0.45 and 0.9 $cm^3/g$.

Said catalyst is generally presented in all the forms known to those skilled in the art, for example in the form of beads (generally having a diameter of between 1 and 8 mm), of extrudates, of blocks or of hollow cylinders. Preferably, it consists of extrudates with a diameter generally of between 0.5 and 10 mm, preferably between 0.8 and 3.2 mm and very preferably between 1.0 and 2.5 mm and with a mean length of between 0.5 and 20 mm. The term "mean diameter" of the extrudates is intended to mean the mean diameter of the circle circumscribed in the cross section of these extrudates. The catalyst can advantageously be presented in the form of cylindrical, multilobal, trilobal or quadrilobal extrudates. Preferably, its shape will be trilobal or quadrilobal. The shape of the lobes could be adjusted according to all the methods known from the prior art.

The specific surface area of the support is generally greater than or equal to 30 $m^2/g$, preferably greater than or equal to 50 $m^2/g$, more preferably between 60 $m^2/g$ and 500 $m^2/g$, and more preferably still between 70 $m^2/g$ and 400 $m^2/g$.

The total pore volume of the catalyst is generally between 0.1 and 1.5 $cm^3/g$, preferably between 0.35 and 1.2 $cm^3/g$, and even more preferably between 0.4 and 1.0 $cm^3/g$, and even more preferably between 0.45 and 0.9 $cm^3/g$.

The catalyst advantageously has a macroporous volume less than or equal to 0.6 ml/g, preferably less than or equal to 0.5 ml/g, more preferably less than or equal to 0.4 ml/g, and even more preferably less than or equal to 0.3 ml/g.

The mesoporous volume of the catalyst is generally at least 0.10 ml/g, preferably at least 0.20 ml/g, preferably between 0.25 ml/g and 0.80 ml/g, more preferably between 0.30 and 0.65 ml/g.

The median mesopore diameter is advantageously between 3 and 25 nm, preferably between 6 and 20 nm and particularly preferably between 8 and 18 nm.

The catalyst advantageously exhibits a median macropore diameter of between 50 and 1500 nm, preferably between 80 and 1000 nm and more preferably still of between 250 and 800 nm.

Preferably, the catalyst exhibits a low microporosity; very preferably, it does not exhibit any microporosity.

Aromatics Hydrogenation Method

Another subject of the present invention is a method for the hydrogenation of at least one aromatic or polyaromatic compound present in a hydrocarbon feedstock having a final boiling point of less than or equal to 650° C., generally between 20 and 650° C. and preferably between 20 and 450° C. Said hydrocarbon feedstock containing at least one aromatic or polyaromatic compound can be chosen from the following petroleum or petrochemical fractions: the reformate from catalytic reforming, kerosene, light gas oil, heavy gas oil, cracking distillates, such as FCC recycle oil, coking unit gas oil or hydrocracking distillates.

The content of aromatic or polyaromatic compounds contained in the hydrocarbon feedstock treated in the hydrogenation method according to the invention is generally between 0.1 to 80% by weight, preferably between 1 to 50% by weight and particularly preferably between 2 to 35% by weight, the percentage being based on the total weight of the hydrocarbon feedstock. The aromatic compounds present in said hydrocarbon feedstock are, for example, benzene or alkylaromatics, such as toluene, ethylbenzene, o-xylene, m-xylene or p-xylene, or also aromatics having several aromatic rings (polyaromatics), such as naphthalene.

The sulfur or chlorine content of the feedstock is generally less than 5000 ppm by weight of sulfur or chlorine, preferably less than 100 ppm by weight and particularly preferably less than 10 ppm by weight.

The technological implementation of the method for the hydrogenation of aromatic or polyaromatic compounds is, for example, carried out by upflow or downflow injection of the hydrocarbon feedstock and of the hydrogen into at least one fixed bed reactor. Said reactor may be of isothermal type or of adiabatic type. An adiabatic reactor is preferred. The hydrocarbon feedstock may advantageously be diluted by one or more reinjection(s) of the effluent, resulting from said reactor where the reaction for the hydrogenation of the aromatics takes place, at various points of the reactor, located between the inlet and the outlet of the reactor, in order to limit the temperature gradient in the reactor. The technological implementation of the method for the hydrogenation of the aromatics according to the invention may also advantageously be carried out by the implantation of at least of said supported catalyst in a reactive distillation column or in reactors-exchangers or in a slurry-type reactor. The stream of hydrogen may be introduced at the same time as the feedstock to be hydrogenated and/or at one or more different points on the reactor.

The hydrogenation of the aromatic or polyaromatic compounds may be carried out in the gas phase or in the liquid phase, preferably in the liquid phase. Generally, the hydrogenation of the aromatic or polyaromatic compounds is carried out at a temperature of between 30 and 350° C., preferably between 50 and 325° C., at a pressure of between 0.1 and 20 MPa, preferably between 0.5 and 10 MPa, at a hydrogen/(aromatic compounds to be hydrogenated) molar ratio between 0.1 and 10 and at an hourly space velocity HSV of between 0.05 and 50 $h^{-1}$, preferably between 0.1 and 10 $h^{-1}$, of a hydrocarbon feedstock containing aromatic or polyaromatic compounds and having a final boiling point below or equal to 650° C., generally between 20 and 650° C. and preferably between 20 and 450° C.

The hydrogen flow rate is adjusted in order to have available a sufficient amount thereof to theoretically hydrogenate all of the aromatic compounds and to maintain an excess of hydrogen at the reactor outlet.

The conversion of the aromatic or polyaromatic compounds is generally greater than 20 mol %, preferably greater than 40 mol %, more preferably greater than 80 mol % and particularly preferably greater than 90 mol % of the aromatic or polyaromatic compounds contained in the hydrocarbon-based feedstock. The conversion is calculated by dividing the difference between the total moles of the aromatic or polyaromatic compounds in the hydrocarbon feedstock and in the product by the total moles of the aromatic or polyaromatic compounds in the hydrocarbon feedstock.

According to a specific alternative form of the method according to the invention, a method for the hydrogenation of the benzene of a hydrocarbon feedstock, such as the reformate resulting from a catalytic reforming unit, is carried out. The benzene content in said hydrocarbon feedstock is generally between 0.1 and 40% by weight, preferably between 0.5 and 35% by weight and particularly preferably between 2 and 30% by weight, the percentage by weight being based on the total weight of the hydrocarbon feedstock.

The sulfur or chlorine content of the feedstock is generally less than 10 ppm by weight of sulfur or chlorine respectively and preferably less than 2 ppm by weight.

The hydrogenation of the benzene contained in the hydrocarbon feedstock may be carried out in the gas phase or in the liquid phase, preferably in the liquid phase. When it is carried out in the liquid phase, a solvent may be present, such as cyclohexane, heptane or octane. Generally, the hydrogenation of the benzene is carried out at a temperature of between 30 and 250° C., preferably between 50 and 200° C. and more preferably between 80 and 180° C., at a pressure of between 0.1 and 10 MPa, preferably between 0.5 and 4 MPa, at a hydrogen/(benzene) molar ratio between 0.1 and 10 and at an hourly space velocity HSV of between 0.05 and 50 $h^{-1}$, preferably between 0.5 and 10 $h^{-1}$.

The conversion of the benzene is generally greater than 50 mol %, preferably greater than 80 mol %, more preferably greater than 90 mol % and particularly preferably greater than 98 mol %.

The invention will now be illustrated by the following examples which are in no way limiting.

EXAMPLES

For all the catalysts mentioned in the examples mentioned below, the support is an alumina A having a specific surface area of 80 $m^2/g$, a pore volume of 0.7 ml/g and a median pore diameter of 12 nm.

Example 1

Preparation of an Aqueous Solution of Ni Precursors

The aqueous solution of Ni precursors (solution S) used for the preparation of catalysts A to G is prepared by dissolving 29 g of nickel nitrate $Ni(NO_3)_2 \cdot 6H_2O$, (supplier Strem Chemicals®) in a volume of 13 ml of distilled water. The solution S, the Ni concentration of which is 230 g of Ni per liter of solution, is obtained.

Example 2

Catalyst A—20% by Weight of Ni (Comparative)

Two solutions S prepared in example 1 are successively dry-impregnated with 10 g of alumina A (two impregnation cycles). The solid thus obtained is subsequently dried in an oven overnight at 120° C., and then calcined under a stream of air of 1 l/h/g of catalyst at 450° C. for 2 hours. The calcined catalyst thus prepared contains 20% by weight of the nickel element relative to the total weight of the alumina-supported catalyst.

Example 3

Catalyst B—20% by Weight of Ni+0.1% of Cu as Pre-Impregnation (Comparative)

Impregnation No. 1
A copper nitrate solution prepared so as to obtain in the end 0.1% by weight of Cu on the final catalyst is dry-impregnated on the alumina A. The solid thus obtained is then dried in an oven overnight at 120° C.

Impregnations Nos. 2 and 3
Two solutions S prepared in example 1 are successively dry-impregnated (two impregnation cycles) on 10 g of the catalyst precursor previously prepared during impregnation no. 1 of copper. The solid thus obtained is subsequently dried in an oven overnight at 120° C., and then calcined under a stream of air of 1 l/h/g of catalyst at 450° C. for 2 hours.

Example 4

Catalyst C—20% by Weight of Ni+1% by Weight of Cu as Ppre-Impregnation (According to the Invention)

The protocol used in this example is identical to that of example 3 above, with the exception that a copper nitrate solution is prepared allowing 1% by weight of Cu to be placed on the alumina.

Example 5

Catalyst D—20% by Weight of Ni+1% by Weight of Cu in Co-Impregnation (Comparative)

A copper nitrate solution is prepared so as to obtain in the end 1% by weight of copper element on the final catalyst.

The copper solution and the solution S are added at the same time to the alumina (co-impregnation). A second step of impregnation of the solution S is subsequently carried out on the catalyst precursor obtained at the end of the first co-impregnation step.

The solid thus obtained is subsequently dried in an oven at 120° C. for 12 h and then calcined under a stream of air of 1 l/h/g of catalyst at 450° C. for 2 hours.

Example 6

Catalyst F—20% by Weight of Ni+2% by Weight of Cu as Post-Impregnation (According to the Invention)

Impregnations Nos. 1 and 2

Two solutions S prepared in example 1 are successively dry-impregnated with 10 g of alumina A (two impregnation cycles). The solid thus obtained is then dried in an oven for 12 h at 120° C.

Impregnation No. 3

A copper nitrate solution is prepared so as to obtain in the end 2% by weight of copper element on the final catalyst, then is dry-impregnated on the catalyst precursor resulting from the second step of impregnation of the solution S.

The solid thus obtained is subsequently dried in an oven at 120° C. for 12 h and then calcined under a stream of air of 1 l/h/g of catalyst at 450° C. for 2 hours.

Example 7

Catalyst E—20% by Weight of Ni+2% by Weight of Cu as Pre-Impregnation (According to the Invention)

The protocol used in this example is identical to that of example 3 above, with the exception that a copper nitrate solution is prepared allowing 2% by weight of Cu to be placed on the alumina.

Example 8

Catalyst G—20% by Weight of Ni+5% by Weight of Cu as Pre-Impregnation (According to the Invention)

The protocol used in this example is identical to that of example 3 above, with the exception that a copper nitrate solution is prepared allowing 5% by weight of Cu to be placed on the alumina.

Example 9

Characterization

All the catalysts contain the contents targeted during impregnation, that is to say 20% of nickel element (characterized by X-ray fluorescence) relative to the total weight of the catalyst, and the % of copper added (characterized by X-ray fluorescence).

The amount of nickel in metallic form obtained after the reduction step was determined by X-ray diffraction (XRD) analysis on samples of catalyst in powder form. Between the reduction step and throughout the duration of the characterization by XRD, the catalysts are never returned to the open air. The diffraction patterns are obtained by radiocrystallographic analysis by means of a diffractometer using the conventional powder method with Kα1 radiation of copper ($\lambda$=1.5406 Å).

The degree of reduction was calculated by calculating the area of the line of Ni$^0$ located around 52°2θ, on all of the diffractograms of each sample of catalyst analyzed, then by subtracting the signal present as soon as ambient temperature is reached under the line at 52°, which is due to alumina. Alumina in delta and theta form, CuO (tenorite) and NiO were detected at ambient temperature on all the copper- and nickel-containing catalysts, after calcination.

Table 1 below collates the degrees of reduction (expressed as % by weight relative to the total weight of Ni) for all the catalysts A to G characterized by XRD after a reduction step at 170° C. for 90 minutes under a hydrogen stream. These values were also compared with the degree of reduction obtained for catalyst A (Ni alone) after a conventional reduction step (that is to say at a temperature of 400° C. for 15 hours under a hydrogen stream).

For catalyst G (5% Cu/20% Ni/alumina) after 90 minutes at 170° C. under a hydrogen (H$_2$) stream, the degree of nickel reducibility is 100% and the degree of copper reducibility likewise. For catalyst A (20% Ni alone/alumina), the degree of nickel reducibility is 0% after exactly the same reduction treatment under hydrogen. Copper clearly makes it possible to reduce all of the nickel oxide present on the reduced nickel)(Ni°) support.

Furthermore, the catalysts containing both copper and nickel were treated under a stream of hydrogen sulfide with a rise in temperature up to 300° C. The XRD spectra were recorded and analyzed as a function of time and temperature. The analysis was that the NiO phase becomes sulfided to Ni$_3$S$_4$ and NiS and the CuO phase oxidizes to Cu$_{1.75}$S. Moreover, copper oxide is the species which becomes sulfided first. This shows that the catalysts prepared by the method according to the invention will be more resistant to sulfur-containing feedstocks compared to catalysts prepared in a known manner, without the presence of copper. Indeed, copper will capture sulfur as a priority, the Ni° remaining available for the hydrogenation of the various compounds of the feedstock to be treated.

Table 1 below summarizes the degrees of reducibility for all the catalysts characterized by XRD after reduction at 170° C. for 90 minutes under a hydrogen stream. For comparison with a conventional reduction, the Ni° content after conventional reduction for 15 h at 400° C. under a hydrogen stream was also added for the Ni alone/alumina. As soon as 1% copper is added as pre-impregnation, the degree of nickel reducibility is 50%, whereas for the same treatment under H$_2$ for the catalyst Ni alone, the degree of nickel reducibility is zero. Furthermore, with the same amount of copper added and the same treatment under H$_2$, the addition of copper as pre-impregnation (catalyst C, 50%)Ni° is more efficient than the addition of copper as post-impregnation (catalyst E, 40%)Ni°, which itself is more effective than the addition of copper as co-impregnation (catalyst D, 30%)Ni°. Furthermore, the addition of 2% copper (catalyst F, 80% Ni°) leads to the same degree of nickel reducibility as catalyst A, which has undergone a treatment at higher temperature (400° C.) and for a longer duration (15 h). Finally, with the addition of 5% copper (catalyst G), 100% Ni° is reached for a treatment under H$_2$ at 170° C. for 90 minutes.

TABLE 1

Ni ° content after reduction at 170° C. for 90 minutes for all the catalysts and also at 400° C. for 15 hours for the Ni alone/alumina catalyst

| Catalyst | Reduction | Copper Content (%) | Copper Impregnation | Percentage of Ni ° (XRD) after reduction (%) |
|---|---|---|---|---|
| A (comparative) | 400° C., 15 h | 0 | — | 80 |
| A (comparative) | 170° C., 90 min | 0 | — | 0 |
| B (comparative) | 170° C., 90 min | 0.1 | Pre-impregnation | 25 |
| C (invention) | 170° C., 90 min | 1 | Pre-impregnation | 50 |
| D (comparative) | 170° C., 90 min | 1 | Co-impregnation | 30 |
| E (invention) | 170° C., 90 min | 1 | Post-impregnation | 45 |
| F (invention) | 170° C., 90 min | 2 | Pre-impregnation | 80 |
| G (invention) | 170° C., 90 min | 5 | Pre-impregnation | 100 |

Example 10

Catalytic Tests: Toluene Hydrogenation Performance Levels

Catalysts A to G described in the above examples are also tested with regard to the reaction for the hydrogenation of toluene.

The hydrogenation reaction is carried out in a 500 ml stainless steel autoclave which is provided with a magnetically driven mechanical stirrer and which is able to operate under a maximum pressure of 100 bar (10 MPa) and temperatures of between 5° C. and 200° C.

216 ml of n-heptane (supplier VWR®, purity >99% chromanorm HPLC) and 2 ml of catalyst (for catalysts from A to G) are added to an autoclave. The autoclave is then pressurized under 35 bar (3.5 MPa) of hydrogen. The catalyst is first reduced in situ at 170° C. for 90 minutes (temperature increase gradient of 1° C./min) for catalysts A to G.

Then the autoclave is brought to the test temperature, equal to 80° C. At time t=0, approximately 26 g of toluene (supplier SDS®, purity >99.8%) are introduced into the autoclave (the initial composition of the reaction mixture is then toluene 6 wt %/n-heptane 94 wt %) and the stirring is started at 1600 rpm. The pressure is kept constant at 35 bar (3.5 MPa) in the autoclave using a storage cylinder located upstream of the reactor. Another test was carried out for catalyst A, but with a catalyst reduction temperature of 400° C. for 15 hours.

The progress of the reaction is monitored by taking samples from the reaction medium at regular time intervals: the toluene is completely hydrogenated to give methylcyclohexane. The hydrogen consumption is also monitored over time by the decrease in pressure in a storage cylinder located upstream of the reactor.

The catalytic activities measured for catalysts A to G are reported in table 2 below. They are related to the catalytic activity ($A_{HYD}$) measured for catalyst A prepared under conventional reduction conditions (at a temperature of 400° C. for 15 hours under a hydrogen stream).

TABLE 2

Comparison of toluene hydrogenation performance levels

| Catalyst | Reduction | Copper Content (%) | Percentage of Ni ° (XRD) after reduction (%) | $A_{HYD}$ (%) |
|---|---|---|---|---|
| A (comparative) | 400° C., 15 h | 0 | 80 | 100 |
| A (comparative) | 170° C., 90 min | 0 | 0 | 0 |
| B (comparative) | 170° C., 90 min | 0.1 | 25 | 45 |
| C (invention) | 170° C., 90 min | 1 | 50 | 101 |
| D (comparative) | 170° C., 90 min | 1 | 30 | 58 |
| E (invention) | 170° C., 90 min | 1 | 45 | 90 |
| F (invention) | 170° C., 90 min | 2 | 80 | 150 |
| G (invention) | 170° C., 90 min | 5 | 100 | 210 |

This clearly shows the improved performance levels of catalysts C, E, F and G according to the invention, compared to the catalyst Ni alone on alumina reduced at 170° C. for 90 min, which is completely inactive, and in particular the impact of the addition of a copper precursor before or after the addition of a nickel precursor within the catalyst precursor during the method for preparing same.

The invention claimed is:

1. A method for preparing a catalyst for the hydrogenation of aromatic or polyaromatic compounds comprising a bimetallic active phase based on a first nickel metal element, in a proportion of 10 to 50% by weight of nickel element relative to the total weight of the catalyst, and a second copper metal element, in a proportion of 0.5 to 15% by weight of copper element relative to the total weight of the catalyst, the molar ratio between the copper and the nickel being less than 1, and a support comprising at least one refractory oxide chosen from silica, alumina and silica-alumina, said method comprising the following steps:
   a) at least one step of bringing the support into contact with at least one solution containing at least one nickel precursor is carried out;
   b) a step of bringing the support into contact with at least one solution containing at least one copper precursor is carried out;
   the steps a) and b) being carried out separately in either order;
   c) at least one step of drying the catalyst precursor at the end of step a) and b), or b) and a), at a temperature lower than 250° C. is carried out;
   d) the catalyst precursor obtained at the end of step c) is supplied to a reactor for the hydrogenation of aromatic compounds, and a step of reduction by bringing said precursor into contact with a reducing gas at a temperature lower than 200° C. for a period greater than or equal to 5 minutes and less than 2 hours is carried out;
   e) a step of passivation of the catalyst obtained in step d) with a sulfur compound is carried out.

2. The method as claimed in claim 1, wherein step b) is carried out before step a).

3. The method as claimed in claim 1, wherein step d) is carried out at a temperature of between 130 and 190° C.

4. The method as claimed in claim 1, wherein step d) is carried out for between 10 minutes and 110 minutes.

5. The method as claimed in claim 1, wherein step e) is carried out at a temperature of between 20 and 350° C. for 10 to 240 minutes.

6. The method as claimed in claim 1,
wherein, in step e), the sulfur compound is chosen from thiophene, thiophane, dimethyl sulfide, diethyl sulfide, dipropyl sulfide, propylmethyl sulfide and dithiodiethanol.

7. The method as claimed in claim 1, wherein a step of drying the catalyst precursor is carried out between step a) and step b), at a temperature less than 250° C.

8. The method as claimed in claim 1, wherein the copper content is between 0.5 and 12% by weight of copper element relative to the total weight of the catalyst.

9. The method as claimed in claim 1, wherein the copper precursor is chosen from copper acetate, copper acetylacetonate, copper nitrate, copper sulfate, copper chloride, copper bromide, copper iodide or copper fluoride.

10. The method as claimed in claim 9, wherein the copper precursor is copper nitrate.

11. The method as claimed in claim 1, wherein the reducing gas of step d) is hydrogen.

12. The method as claimed in claim 11, wherein the hydrogen flow rate, expressed in l/hour/gram of catalyst precursor is between 0.01 and 100 l/hour/gram of catalyst precursor.

13. The method as claimed in claim 1, wherein a step of heat treatment of the dried catalyst precursor obtained in step c) is carried out, before step d), at a temperature of between 250 and 1000° C.

14. The method as claimed in claim 1, wherein the support is an alumina.

15. A method for the hydrogenation of at least one aromatic or polyaromatic compound present in a hydrocarbon feedstock having a final boiling point of less than or equal to 650° C., said method being carried out in the gas phase or in the liquid phase, at a temperature of between 30 and 350° C., at a pressure of between 0.1 and 20 MPa, at a hydrogen/(aromatic compounds to be hydrogenated) molar ratio between 0.1 and 10 and at an hourly space velocity HSV of between 0.05 and 50 $h^{-1}$, in the presence of a catalyst obtained as claimed in claim 1.

* * * * *